L. L. SUMMERS.
PROCESS FOR PRODUCING REACTIONS IN GASES AND APPARATUS FOR PRACTISING THE SAME.
APPLICATION FILED NOV. 25, 1911.
1,130,941. Patented Mar. 9, 1915.
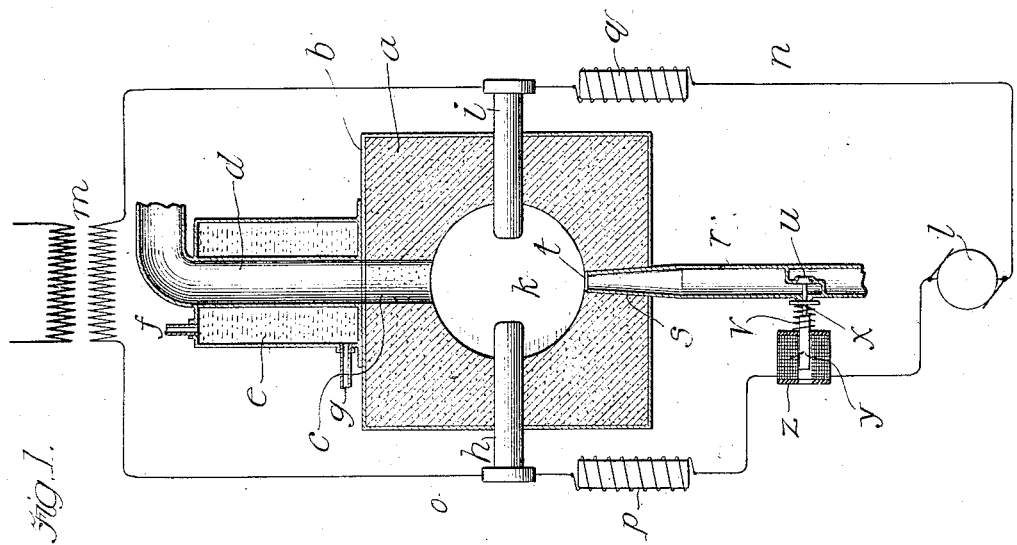
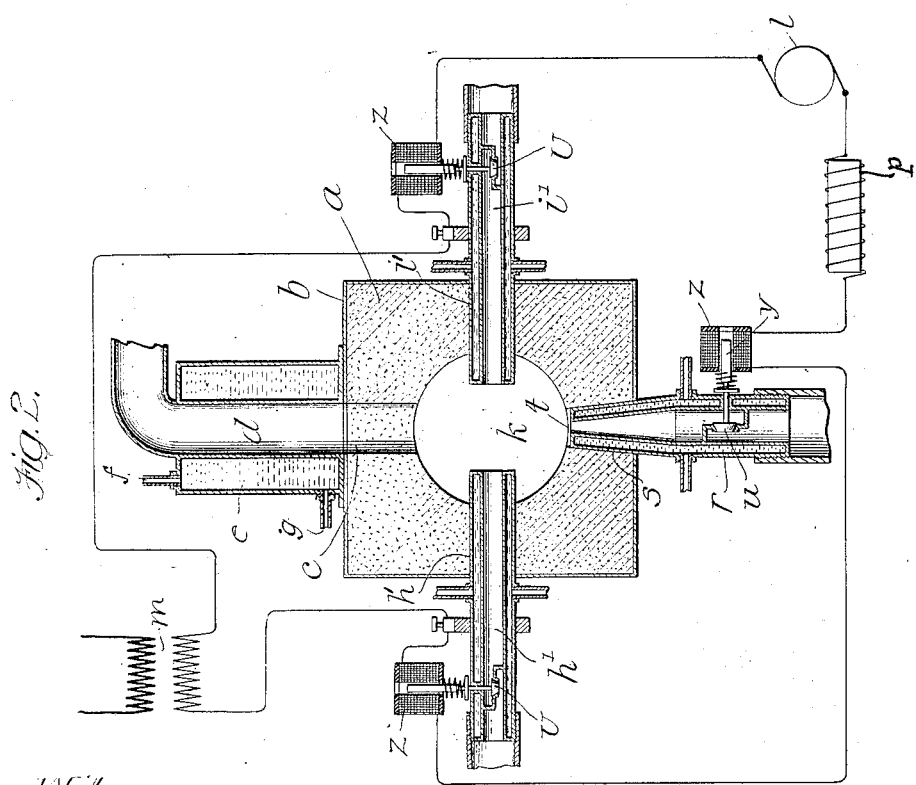

UNITED STATES PATENT OFFICE.

LELAND L. SUMMERS, OF CHICAGO, ILLINOIS.

PROCESS FOR PRODUCING REACTIONS IN GASES AND APPARATUS FOR PRACTISING THE SAME.

1,130,941.  Specification of Letters Patent.  Patented Mar. 9, 1915.

Application filed November 25, 1911. Serial No. 662,453.

*To all whom it may concern:*

Be it known that I, LELAND L. SUMMERS, a citizen of the United States, residing at Chicago, in the county of Cook and State of Illinois, have invented a new and useful Improvement in Processes for Producing Reactions in Gases and Apparatus for Practising the Same, of which the following is a specification.

My invention relates more particularly to the synthesis of gaseous compounds such for example as the oxids of nitrogen which require for their formation an intense degree of heat, yet which are readily dissociated at substantially the temperatures of their formation. It is well known that in a process for the formation of such compounds it is desirable that their temperature be reduced as soon as possible after their formation in order to prevent their decomposition at the high temperature employed and various procedures and apparatus have been conceived and devised with this end in view.

In certain former applications Nos. 418,505 filed Feb. 29, 1808, and 494,386 filed May 6, 1909, I have described suitable processes and apparatus for accomplishing the synthesis of certain compounds of nitrogen. Briefly stated, the processes described in these prior applications consist in highly heating one of the reacting substances from which the gas is formed and introducing to it while in the highly heated state the other substance in a cool or refrigerated condition. In the processes of these earlier applications one of the substances taking part in the reaction is a solid and the other substance or substances and the products of the reaction are gases. The solid material is heated to the necessary temperature for the reaction and the gaseous re-agent introduced in the refrigerated state and since the product of the reaction is volatile or gaseous it immediately mingles with that portion of the cold gas which has not entered into combination and has its temperature reduced thereby to such a degree that it is stable. The gases containing the product are drawn off and the latter separated. In this manner decomposition or dissociation of the formed product in the heated zone of reaction is prevented. In a third application covering this general subject matter and of even date herewith Serial No. 662,452, I have described a process and apparatus for the synthesis of gaseous compounds in which both or all the reacting substances are gases and the more inert is highly heated in an electric arc and the other gas admitted thereto at suitable intervals, the resulting gases containing the desired products being withdrawn immediately to a cooler region. In this manner the molecular bonds between the atoms of the more inert gas are weakened to such an extent by the heat that they readily combine with the atoms of the more active gas which require no heating by reason of the relatively less molecular stability. The cool or refrigerated gas serves to immediately reduce the temperature of the products and their stability is further insured by immediate removal from the arc or heat zone.

In my present process, which will be described more in detail below, I provide an additional step for preventing the dissociation of the formed product. In the present invention, I likewise employ an electric arc as the heating means and provide for the immediate withdrawal of the gases containing the product of reaction to a cooler region. The process of the present application coincides in these respects with that of the application of even date, referred to above. Instead, however, of employing a continuous arc for heating purposes, I provide for the intermittent extinction thereof immediately following the admission thereto of a volume of the reacting gases and their combination, whereby the desired compounds are formed during the existence of the arc and immediately cooled by the extinction thereof.

In practising this invention, the reacting gases may be introduced together if desired but preferably they are introduced separately as in the process of the application last referred to, the more inert gas receiving a comparatively prolonged heating to raise it to the desired temperature, and the more active gas introduced intermittently just prior to the extinction of the arc, whereby as in the process of the companion application the bonds of the inert gas are weakened and it is put in condition for a combination with the more active gas. The latter may, if desired, be refrigerated or cooled to any desired or advantageous extent, though this is not essential.

In the following specification, I have described the invention more particularly with reference to the formation of the oxides of nitrogen but it is to be understood that it is not limited thereto but is applicable to the synthesis of other compounds of nitrogen and to compounds in which nitrogen does not enter and my invention is correspondingly broad as set forth in the following claims. Furthermore, my invention is not limited to the treatment of substances which are normally gaseous but is clearly applicable to any materials which may be introduced into the heated zone in a sufficiently fluid form as for example in the form of vapor or in that of a spray.

In the accompanying drawings, I have shown diagrammatically two preferred forms and arrangements of apparatus for practising my process but it is to be understood that it may be practised in other apparatus of suitable character and that my invention, in so far as it relates to the apparatus, is not limited to either specific construction shown but embraces a wide range of equivalents thereof, which come within the scope of the following claims.

Referring now to the accompanying drawings, Figure 1 represents a form and arrangement of apparatus designed for the introduction of the gases together as a mixture, and Fig. 2 an apparatus and arrangement designed for the introduction of the gases separately both views being partly sectional and partly diagrammatic.

In that form of apparatus represented in Fig. 1, I employ as a reaction chamber a furnace $a$ of suitable refractory surrounded by a sheet metal jacket $b$ and provided with an opening or flue $c$ for the escape of gases and products of the reaction. Registering with the flue $c$ is a cooling chamber $d$ which in this instance is in the form of a water cooled conduit having a surrounding water chamber $e$ provided with inlet and outlet ports $f$, $g$. A pair of electrodes $h$, $i$, the members of which extend into the furnace chamber $k$ are spaced apart a sufficient distance to maintain a suitable arc and are connected to a dynamo $l$, alternating generator or other suitable source of low tension, large volume current. Preferably the dynamo is of such character and the electrodes so arranged that the arc produced, while of great heating capacity or volume, is not very stable and the dynamo is capable of maintaining the arc, once established, but not of starting the same. For the latter purpose, I employ a separate circuit with means for producing an intermittent spark or current of suitable frequency and of a voltage sufficient to leap the electrode gap and so establish the heating arc before referred to. For this purpose, a suitable means is a transformer such as shown at $m$, the secondary of which is connected up to the electrodes $h$, $i$, and the primary to any suitable source of alternating current. In order to protect the main circuit $n$ including the dynamo or generator $l$ and prevent it short-circuiting the high tension circuit $o$, I provide one or more inductances or choking coils $p$, $q$, therein, which may be designed to permit the passage of direct current or a current of the frequency of the alternating generator if the latter is employed but to choke off the high frequency currents. A suitable conduit $r$ is provided with a twyer $s$ extending into an opening $t$ in the wall of the furnace at a point substantially opposite the arc between the electrodes and a valve $u$ controls the flow through the conduit of the gases which are to take part in the reaction. The valve is normally pressed to its seat by a spring $v$ but to its stem $x$ is attached the movable core $y$ of a solenoid $z'$, the winding of which is interposed in the main circuit. Whenever a current flows through the main circuit by reason of the establishment of the arc in the furnace, the solenoid will open the valve and permit the flow of gases to the furnace chamber.

In operation the dynamo $l$ will be continuously operated impressing a voltage across the arc gap and the primary of the transformer $m$ will also be continuously furnished with alternating current. A spark or series of sparks will then leap the arc gap and the heating arc produced by the current from the dynamo will thereupon be established in the well known manner. As soon, however, as the arc is established, the valve $u$ will be opened by the solenoid and the gases under pressure will be injected into the furnace chamber, and immediately extinguish the arc by blowing it out but not, however, before their temperature has been sufficiently raised to effect their combination. As soon as the arc is extinguished it is immediately reëstablished by the high tension current in the manner before described and again extinguished by the injection of gases. The process is therefore intermittent but the steps thereof may follow with such rapidity as to cause substantially a continuous flow of products into and through the cooling chamber $d$. In the process thus far described and practised in the apparatus of Fig. 1, the gases to be combined are fed together into the furnace through a single conduit. It is sometimes desirable however in operating with certain gases to subject one of the reacting gases to the effects of the arc for a longer period than that for which the other gas is subjected, and with this end in view in Fig. 2, I have shown a furnace adapted for the separate introduction of the gases. In this construction, the furnace body $a$, the outlet flue $c$, cooling chamber $d$, conduit $r$, twyer $s$, generator $l$ and circuits are substantially as before described, but the conduit and twyer serve only for the introduction of the more active gas which may, if desired, be cooled or refrigerated to any desired extent before its introduction into the furnace chamber. The electrodes $h'$, $i'$, are hollow and provided with valves U, U and serve for the introduction of the more inert gas, though obviously this gas could be introduced in any other manner. The twyer and electrodes may be and preferably are water-cooled and are so shown in the drawing and the valves U, U therein are controlled by electromagnetic means Z, Z similar to the solenoid $z'$ above described and likewise included in the main circuit. Preferably, however, in this form of the device, the solenoid $z'$ is more sluggish than the solenoids Z, Z so that the more inert gases are introduced into the arc an appreciable period before the more active gas with the result that they are thoroughly heated before coming in contact with the latter. After the desired temperature is attained a blast of the more active gas is automatically admitted by the operation of valve $u$ and the arc extinguished and this operation may be repeated indefinitely as in the other described form of apparatus.

By the process and means herein described, I am enabled to heat the gases or that one of them requiring a high heat for its molecular dissociation to a high temperature and immediately upon the formation of the compounds reduce the temperature to a point at which the compounds are perfectly stable and therefore I am enabled to get a much higher percentage of the desired products than has been possible with the treatment and apparatus heretofore used.

While I have disclosed automatic means for carrying my improved process into effect, it is obvious that it may be controlled by hand, to a greater or less extent, though the operation would necessarily be slower. And there are certain possibilities and advantages in the slower operation, whether controlled automatically or by hand, among which may be mentioned that the reëstablishment of the arc after its extinction may be delayed until all or substantially the products of the previous reaction shall have been completely driven out of the chamber.

I claim:

1. A process for the formation of gaseous compounds which consists in feeding the component gases separately to a source of heat and then extinguishing the latter.

2. A process for the synthesis of gases consisting in feeding the component gases separately to an electric arc and then extinguishing the arc.

3. A process for the synthesis of gases consisting in first feeding the more inert gas to an arc, then feeding the more active gas thereto, and finally extinguishing the arc.

4. A process for the synthesis of gaseous compounds consisting in forming an arc feeding gas thereto and injecting another gas under pressure into the arc and thereby extinguishing the latter.

5. An intermittent process for the formation of gaseous compounds consisting in establishing an arc, feeding one of the gases thereto, injecting the other gas under pressure into the arc, and thereby extinguishing the same, and immediately reëstablishing the arc.

6. The process for the formation of gaseous compounds from an inert and a relatively active gas consisting in establishing an arc, feeding the more inert gas thereto, and subsequently injecting the more active gas under pressure and thereby extinguishing the arc.

7. A process for the formation of compounds of nitrogen consisting in forming an arc, feeding nitrogen thereto, and subsequently injecting a more active gas under pressure and thereby extinguishing the arc.

8. A process for the formation of gaseous compounds of nitrogen consisting in forming an arc, supplying the component gases separately thereto, one of the gases being injected into the arc under pressure and thereby extinguishing the latter.

9. A process for the formation of oxides of nitrogen consisting in establishing an arc, feeding nitrogen thereto, and subsequently injecting oxygen under pressure and thereby extinguishing the arc.

10. A process for the formation of gaseous compounds consisting in establishing an arc, feeding the gaseous components thereto, one of the components being injected under pressure into the arc and thereby extinguishing the arc and removing the gases containing the products to a cooling chamber.

11. In an apparatus for effecting the synthesis of gases at high temperatures, a pair of electrodes, means for supplying a current of large volume and low voltage to the electrodes to form an arc, and means for feeding one of the gases to the arc and injecting the other into the arc to extinguish the latter.

12. In an apparatus for the synthesis of gaseous compounds, a furnace comprising a pair of electrodes, means for furnishing a current of low voltage and great quantity to the electrodes, a twyer adapted to inject gases into the arc, and means operated by the current in the electrode circuit for controlling the flow of gases to the twyer.

13. In an apparatus for the synthesis of gaseous compounds, a pair of electrodes, a source of current of high volume and low voltage connected thereto, a source of current of high voltage and low volume also connected to the electrodes, and means for injecting gases into the arc controlled by the current of large volume and low voltage.

14. In an apparatus for effecting the synthesis of gaseous compounds, the combination of a furnace, a pair of electrodes projecting thereinto, a main circuit, means for furnishing thereto a current of low voltage and high amperage, a second circuit likewise connected to the electrodes and a transformer therein for furnishing a current of high voltage and small volume, a twyer projecting into the furnace, a conduit for supplying the twyer with gases, a valve in the conduit and solenoids in the main circuit for controlling the valve, and an inductance also in the main circuit for preventing short-circuiting of the high tension circuit.

15. A process for the synthesis of gases consisting in impressing upon the arc of an electric furnace an electromotive force just capable of maintaining a current but not of establishing it, intermittently impressing a higher electromotive force to establish the arc, and injecting under pressure gases to be synthetized into the arc when it has been established and thereby extinguishing the arc.

16. A process for the formation of gaseous compounds which consists in feeding the component gases to a source of heat, extinguishing the latter, removing the products from the source of heat and reestablishing the same.

17. A process for the synthesis of gases consisting in feeding the component gases to an electric arc extinguishing the latter, removing the product from the neighborhood of the arc and then reestablishing the arc.

LELAND L. SUMMERS.

Witnesses:
JOHN B. MACAULEY,
ROBERT DOBBERMAN.